United States Patent [19]

Hayashi

[11] Patent Number: 4,706,178

[45] Date of Patent: Nov. 10, 1987

[54] POWER CONVERSION SYSTEM

[75] Inventor: Shigeo Hayashi, Hyogo, Japan

[73] Assignee: Mitsubishi Denki Kabushiki Kaisha, Japan

[21] Appl. No.: 871,382

[22] Filed: Jun. 6, 1986

[30] Foreign Application Priority Data

Sep. 20, 1985 [JP] Japan .................................. 60-206321

[51] Int. Cl.[4] ............................................ H02M 7/44
[52] U.S. Cl. ........................................ 363/98; 363/37; 363/41
[58] Field of Search ........................ 363/37, 41, 85, 87, 363/98, 127, 128, 132; 323/906

[56] References Cited

U.S. PATENT DOCUMENTS 3,970,916  7/1976  Kienscherf ............................ 363/41

FOREIGN PATENT DOCUMENTS 0010900  5/1980  European Pat. Off. .............. 363/41
56-44380  4/1981  Japan .
0828365  5/1981  U.S.S.R. ................................. 363/41

OTHER PUBLICATIONS

Bose et al., "Microcomputer Control of a Residential Photovoltaic Power Conditioning System", IEEE, 1984, pp. 852–859.

Primary Examiner—Patrick R. Salce
Assistant Examiner—Judson H. Jones
Attorney, Agent, or Firm—Bernard, Rothwell & Brown

[57] ABSTRACT

A power conversion system includes an inverter for transforming d.c. power into high-frequency a.c. power, a high-frequency transformer for changing the voltage and isolating the input and output power lines, and a rectifier which rectifies the transformer output in synchronism with the inverter output and in timing relationship so that the averaged voltage waveform of the rectified output is sinusoidal.

1 Claim, 19 Drawing Figures

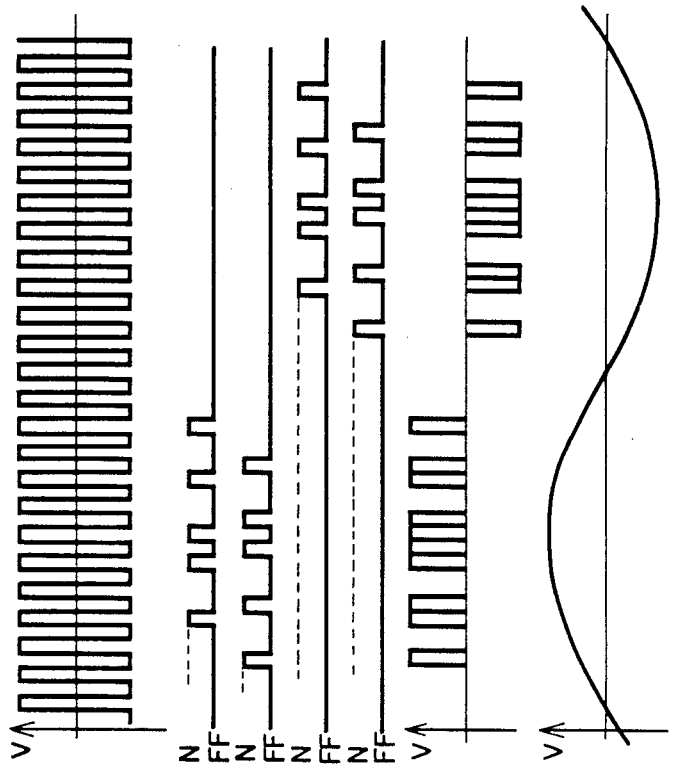

POWER CONVERSION SYSTEM

BACKGROUND OF THE INVENTION

1. Field of the Invention

The present invention relates to a power conversion system and, particularly to a power conversion system for producing a.c. power having the commercial frequency and voltage from a d.c. power source such as a solar power generator, a fuel cell or a battery incorporated in an uninterruptable power supply system.

2. Description of the Prior Art

There is a great demand for power conversion systems for converting d.c. power into a.c. power having the commercial frequency and voltage for use with solar power generators and fuel cells which supply power to existing commercial power systems and for use in uninterruptable power supply systems incorporating batteries. For this purpose, there have been frequently used DC-to-AC converters (inverters) employing the type of pulse width modulation system, and many of them have used a transformer for isolating the d.c. lines from the a.c. lines.

FIG. 1 is a schematic diagram of an inverter for producing a sinusoidal a.c. output by employment of the conventional pulse width modulation system. The arrangement shown includes d.c. input terminals 1 and 2, a.c. power output terminals 3 and 4, transistors 11 through 14, a capacitor 21, a transformer 23, a filter 50, and a d.c. power source 60.

The operation of the above arrangement is as follows. The transistors 11 and 14 in pairs and the transistors 12 and 13 in pairs operate to become conductive or nonconductive alternately and simultaneously. For example, when the transistor pair 11 and 14 becomes conductive, a voltage will appear between the a.c. output terminals 3 and 4 with the former being positive, and when the transistor pair 12 and 13 becomes conductive, a voltage will appear between the terminals 3 and 4 with the latter being positive. Accordingly, by controlling the ON-period of the transistors appropriately, an output voltage having an approximately sinusoidal waveform can be produced at the a.c. output terminals, as shown in FIG. 2. Waveform (a) in FIG. 2 shows the switching operation of the transistor pair 11 and 14, while waveform (b) shows the switching operation of the transistor pair 12 and 13. Waveform (c) shows the a.c. output voltage waveform at the a.c. output terminals 3 and 4 when the filter 50 in FIG. 1 is absent, while waveform (d) shows the a.c. output voltage waveform when the filter 50 is used. Waveform (e) shows the magnetic flux density in the core of the transformer 23 shown in FIG. 1. The foregoing power conversion system is called a sinusoidal inverter of the type employing a pulse width modulation (PWM) system.

In the conventional pulse width modulated sinusoidal inverter, the transistors operate for switching at a frequency incomparably higher than the a.c. output frequency. Nevertheless, the transformer needs to transmit a.c. power at the lower a.c. output frequency, as shown by the variation of the magnetic flux density in the transformer core in waveform (e), and therefore a large low-frequency oriented transformer is required inherently. Such a transformer is bulky and heavy, and comprises the greater part of both the space and the weight of the power conversion system. At the same time, a great proportion of the overall system loss is derived from the loss created by the transformer.

SUMMARY OF THE INVENTION

It is a prime object of the present invention to provide a novel power conversion system which eliminates the foregoing prior art problems.

Another object of this invention is to provide a power conversion system including a sinusoidal power inverter with a transformer section reduced in size and weight and a reduced power loss through the high-frequency operation of the transformer.

Other objects and advantages of the present invention will become more apparent from the following detailed description taken in conjunction with the accompanying drawings.

BRIEF DESCRIPTION OF THE DRAWINGS

FIGS. 5(a)-5(i) are a set of waveform diagrams showing the operation of the system shown in FIG. 3.

DESCRIPTION OF THE PREFERRED EMBODIMENTS

Embodiments of the present invention will now be described with reference to FIGS. 3 through 7.

Figure 1:
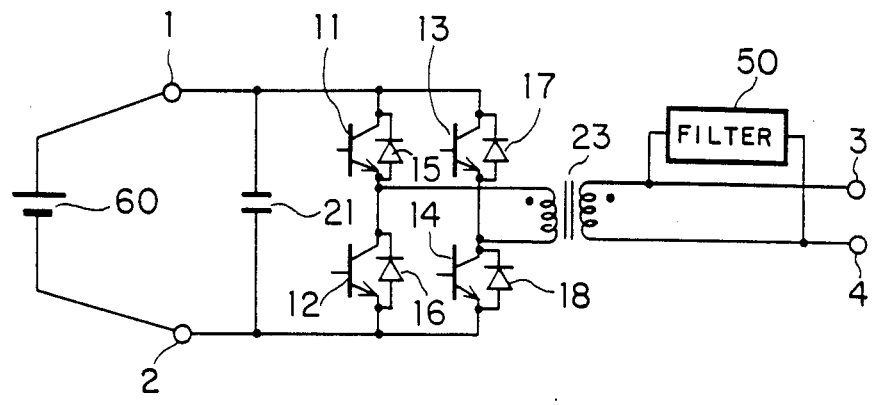
FIG. 1 is a schematic diagram of the conventional sinusoida-output power conversion system.
Figure 2:
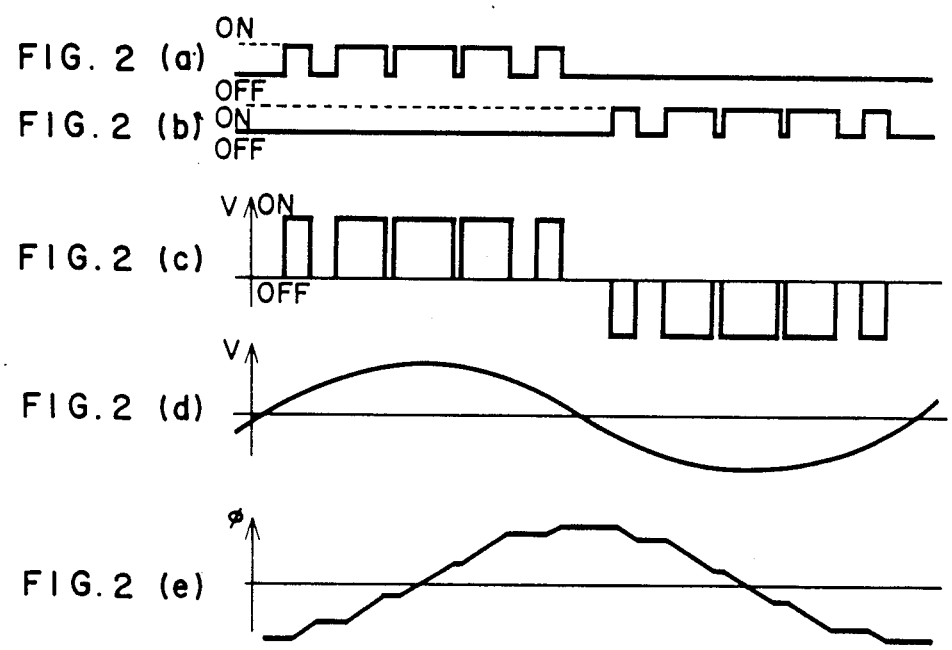
FIGS. 2(a)-2(e) are a set of waveform diagrams showing the operation of the system shown in FIG. 1.
Figure 3:
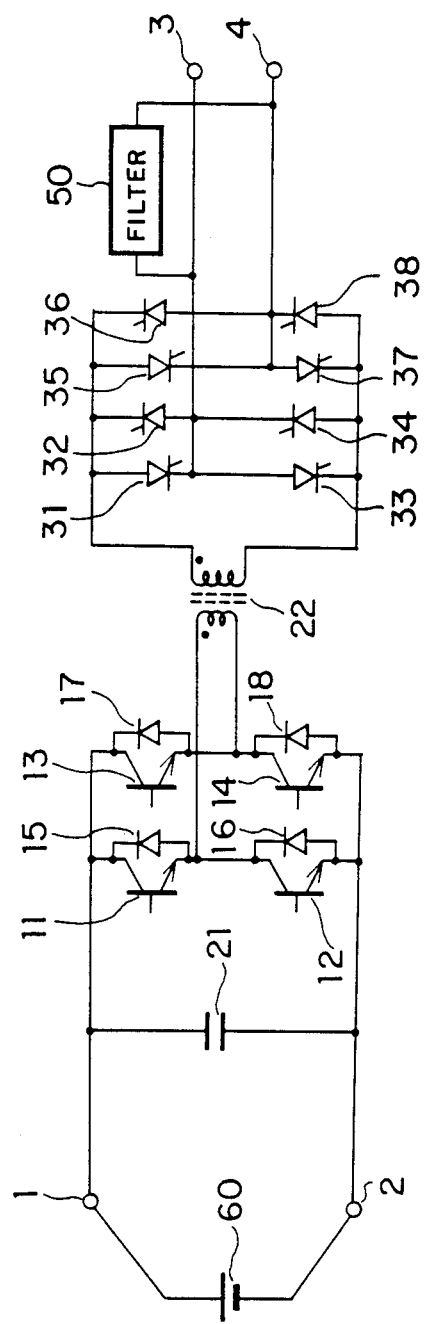
FIG. 3 is a schematic diagram of a power conversion system embodying the present invention.

In FIG. 3, where the counterparts to those in FIG. 1 are referred to by the common symbols, the system arrangement further includes a high-frequency transformer 22 and fast-operating thyristors 31 through 38.

Figure 4:
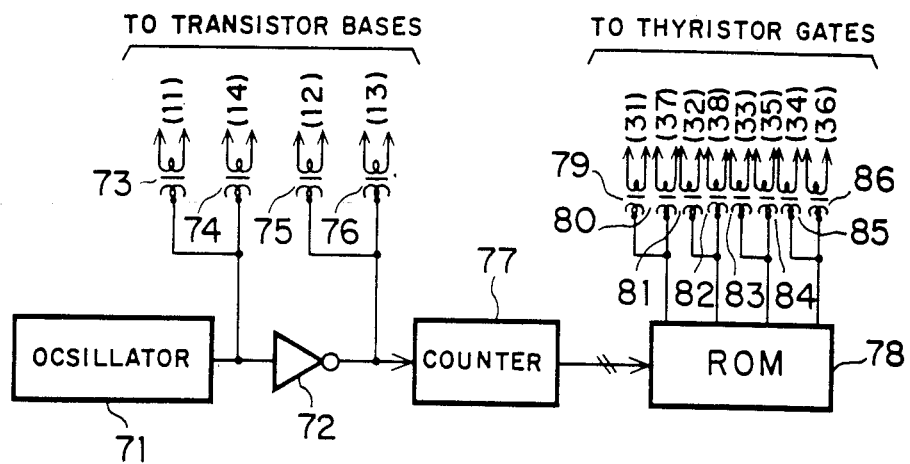
FIG. 4 is a block diagram showing the control circuit for the power conversion system shown in FIG. 3.

FIG. 4 shows the control circuit for controlling the operation of the transistors 11–14 and thyristors 31–38 in FIG. 3. The circuit arrangement includes an oscillator 71, a logical negating circuit (inverter) 72, pulse transformers 73–76, a counter 77, a rewritable non-volatile memory device (ROM) 78, and pulse transformers 79–86.

FIG. 5 is a set of waveform diagrams explaining the operation of the system arrangement shown in FIG. 3, in which waveform (a) shows the base voltage of the transistors 11 and 14, waveform (b) shows the base voltage of the transistors 12 and 13, waveform (c) shows the output voltage of the inverter, i.e., the voltage across the primary winding of the high-frequency transformer 22, waveform (d) shows the gate signal to the thyristors 31 and 37, waveform (e) shows the gate signal to the thyristors 34 and 36, waveform (f) shows the gate signal to the thyristors 33 and 35, waveform (g) shows the gate signal to the thyristors 32 and 38, waveform (h) shows the a.c. voltage between the a.c. output terminals 3 and 4 when the filter 50 in FIG. 3 is absent, and waveform (i) shows the a.c. voltage between the a.c. output terminals 3 and 4 when the filter 50 is connected. These waveforms (a)-(i) are plotted on the common time axis.

The operation of this embodiment is as follows. In FIG. 3, the transistors 11–14 are in the bridge connection to form an inverter, which is supplied with d.c.

power from the d.c. power source 60. The transistors 11-14 have their bases receiving the high-frequency rectangular signals originating from the oscillator 71 through the respective pulse transformers 73-76 shown in FIG. 4. The transistors 11 and 14 receive the base signal shown waveform (a) in FIG. 5, while the transistors 12 and 13 receive the base signal shown in waveform (b) which is 180° out of phase with the former base signal shown by waveform (a). In consequence, the voltage received by the high-frequency transformer 22 is a high-frequency rectangular wave as shown in waveform (c), and such a transformer can be a compact high-frequency transformer using ferrite, amorphous metal, or the like for the core. The high-frequency transformer 22 provides a high-frequency rectangular output voltage, which is fed to a rectifying circuit made up of thyristors 31-38. The rectifying circuit is a full-wave rectifying bridge having antiparallel-connected thyristors for each arm. The ROM device 78 shown in FIG. 4 provides the control signals to the gates of the thyristors 31-38 through the respective pulse transformers 79-86. The ROM output signals vary cyclically in response to the address input provided by the counter 77 in FIG. 4.

FIG. 5 shows by waveforms (d) through (g) the gate signals to the thyristors 31-38. By turning on the thyristors 31 and 37, or thyristors 34 and 36 in compliance with the voltage polarity at the secondary winding of the transformer 22, a positive voltage will appear on the a.c. output terminal 3 with respect to the terminal 4, and by turning on the thyristors 32 and 38, or thyristors 33 and 35 in compliance with the voltage polarity at the secondary winding of the transformer 22, a negative voltage will appear on the a.c. output terminal 3 with respect to terminal 4. Accordingly, by arranging the on/off timing relationship appropriately for the thyristor control signals produced by the ROM device 78, it becomes possible to make the average value of the voltage across the terminals 3 and 4 approximate to a low-frequency sinusoidal voltage waveform. The waveforms (d)-(g) in FIG. 5 show the timing relationship of the thyristor control signals for producing an approximately sinusoidal waveform for the average value of the voltage across the a.c. output terminals 3 and 4. When the filter 50 is not connected, the voltage across the a.c. output terminals 3 and 4 is as shown by waveform (h) in FIG. 5. By provision of a low-pass filter 50 consisting of capacitors, reactors or a combination thereof between the a.c. output terminals 3 and 4, the output voltage can be made virtually sinusoidal as shown by waveform (i) in FIG. 5.

In the inventive power conversion system, the rectifier outputs have pulse widths with increments determined from the operating frequency of the transistor inverter, and therefore the higher the inverter operating frequency, the more accurate the approximation for the sinusoidal waveform which can be achieved for the low-frequency a.c. output voltage. On this account, instead of the example shown in FIG. 5, in which the inverter operating frequency is set 24 times the low-frequency a.c. output frequency, much higher frequencies are actually used to achieve better sinusoidal approximation, and at the same time the low-pass filter 50 and high-frequency transformer 22 can be made more compact.

Practical transformers create power loss due to resistance components of the windings and to the core, and they are subjected to d.c. excitation if the excitation voltage, even though it is a high-frequency a.c. voltage, is rectified asymmetrically for both polarities by the rectifying circuit. The d.c. excitation of the transformer can be prevented by implementing rectification sequentially for the positive and negative cycles of the voltage produced by the inverter as shown by waveforms (c)-(h) in FIG. 5. As a result, the high-frequency transformer 22 may be one which can transmit the high-frequency a.c. voltage shown by waveform (c) in FIG. 5, and it can be made more compact as the inverter operating frequency increases.

In FIGS. 3 and 4, the low-frequency a.c. output voltage can be controlled by changing the duty cycle of the base signals to the transistors in the inverter. The base signals shown by waveforms (a) and (b) in FIG. 5 have a duty cycle of 50%, and by changing the duty cycle to 25%, the average value of the inverter output voltage can be halved, and the average value of the low-frequency a.c. output voltage is also halved, for example.

Figure 6:
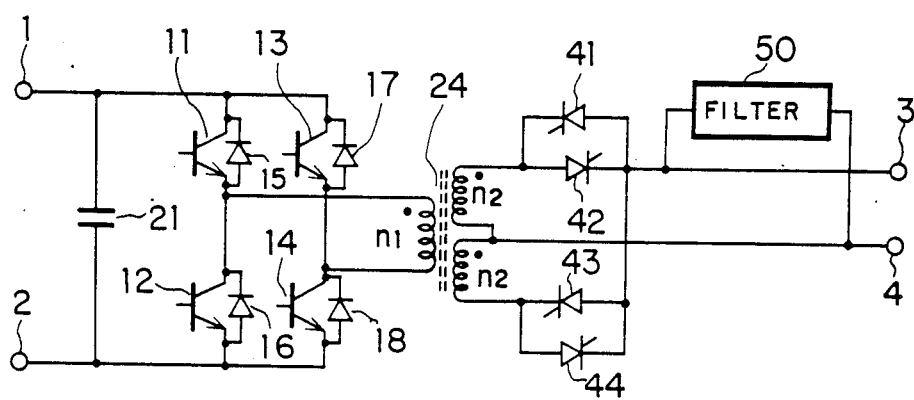
FIGS. 6 and 7 are schematic diagrams showing other embodiments of the present invention.
Figure 7:
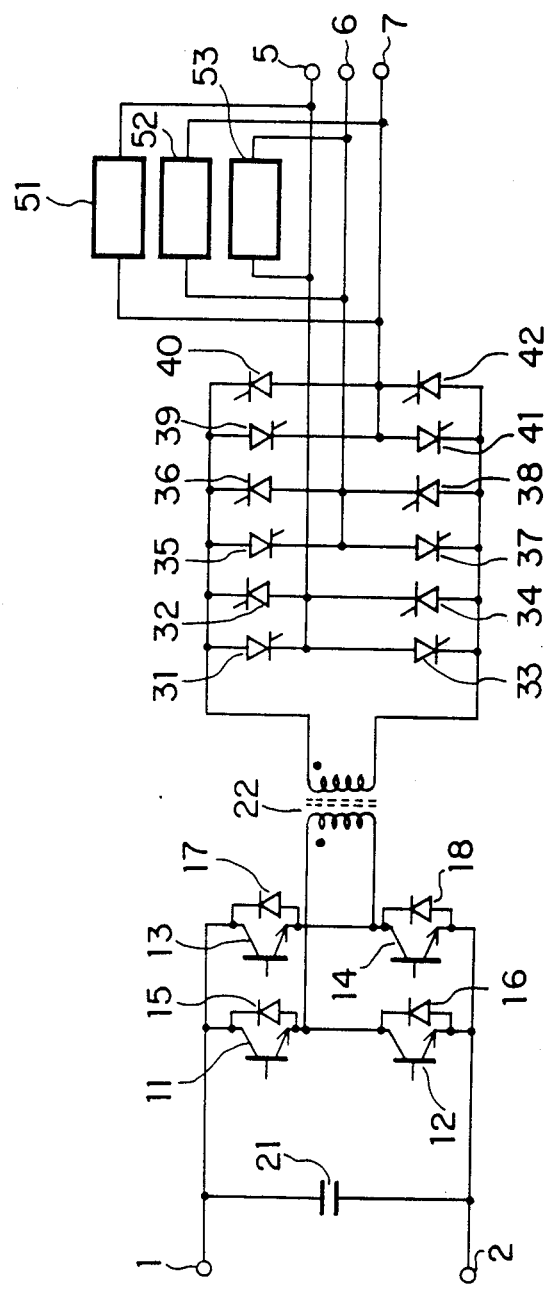

Although in the foregoing embodiment a transistor inverter has been described, the present invention is not limited to this, but the inverter can be constructed using other semiconductor devices such as FETs, gate turn-off thyristors, or static induction transistors. Although the above embodiment uses thyristors as a synchronous rectifier, other semiconductor devices such as triacs, gate turn-off thyristors, static induction thyristors, or serial connections of an FET and a diode may be used. Although a full-wave bridge inverter has been described, it may be replaced with a half-wave bridge inverter. Using a transformer having a neutral point output on the secondary side as shown in FIG. 6, only four rectifying devices are needed to achieve the same effect as of the foregoing embodiment. Although the above embodiment is of single-phase a.c. output, it can readily be modified to produce a three-phase a.c. output by using an increased number of rectifying devices as shown in FIG. 7. In this case, the synchronous rectifiers need to be controlled so that a three-phase sinusoidal output waveform is obtained. It is also possible to arrange the system for producing a four-phase or higher-order multi-phase sinusoidal output.

Although in the foregoing embodiment the low-frequency a.c. output voltage is varied by changing the duty cycle of the transistors in the high-frequency inverter, it can also be varied by changing the switching timing relationship in the stage of sinusoidal modulating rectification. The low-frequency a.c. output voltage can also be varied by changing the voltage of the d.c. power source.

According to this invention, as described above, d.c. power is transformed into high-frequency a.c. power by the inverter, and after the a.c. power has been transmitted through the transformer it is subjected to sinusoidal modulating rectification in synchronism with the high-frequency a.c. voltage. Consequently, the transformer can be reduced in size and weight significantly, and as a result a compact, light weight, high efficiency, and inexpensive power conversion system producing a sinusoidal output can be accomplished.

What is claimed is:

1. A power conversion system comprising:
   (a) an inverter for retransforming d.c. power into high-frequency a.c. power through switching operations of semiconductor switches forming a bridge circuit;

(b) a high-frequency transformer for changing the voltage of the a.c. power produced by said inverter;

(c) a semiconductor rectifier for rectifying the output of said high-frequency transformer in synchronism with the output of said inverter; and (d) a control circuit for controlling the switching operation of said inverter and said semiconductor rectifier so that said semiconductor rectifier produces an output voltage having a sinusolidal waveform;

(e) said control circuit comprising:

(1) pulse transformers for supplying control signals to said inverter in response to a switching signal provided by an oscillation circuit;

(2) a logical negating circuit for reversing the polarity of said switching signal;

(3) a counter for counting the output of said logical negating circuit;

(4) a ROM device for storing control signals to said semiconductor rectifier and supplying a control signal by being addressed by the output of said counter; and (5) pulse transformers for supplying the output of said ROM device to said semiconductor rectifier.

* * * * *

UNITED STATES PATENT AND TRADEMARK OFFICE
CERTIFICATE OF CORRECTION

PATENT NO. : 4,706,178

DATED : November 10, 1987

INVENTOR(S) : Shigeo Hayashi

It is certified that error appears in the above-identified patent and that said Letters Patent is hereby corrected as shown below:

Column 4, line 65, "retransforming" should be --transforming--.

Signed and Sealed this

Seventeenth Day of May, 1988

Attest:

DONALD J. QUIGG

Attesting Officer

Commissioner of Patents and Trademarks